E. G. DEAN.
TUBE MAKING MACHINE.
APPLICATION FILED FEB. 21, 1908.
1,054,961.
Patented Mar. 4, 1913.
5 SHEETS—SHEET 3.
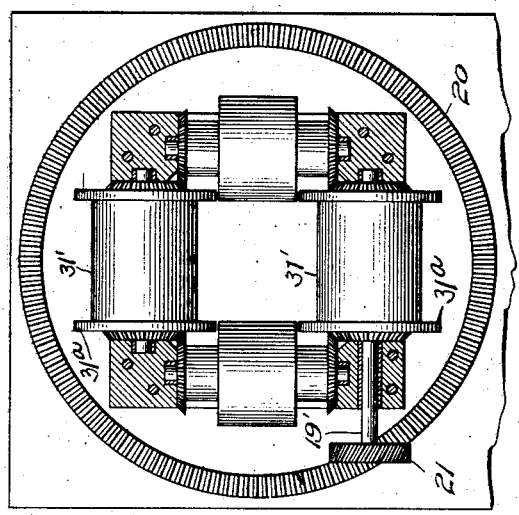
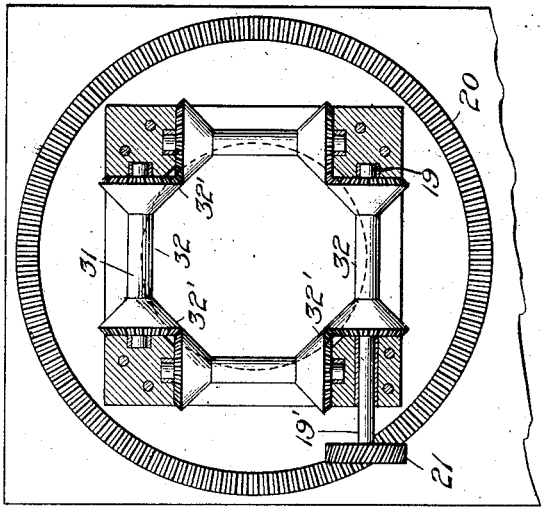
Witnesses
C. C. Wright
N. Curtis Hammond
Inventor
Elmer G. Dean
By Geo. B. Pitts.
Attorney

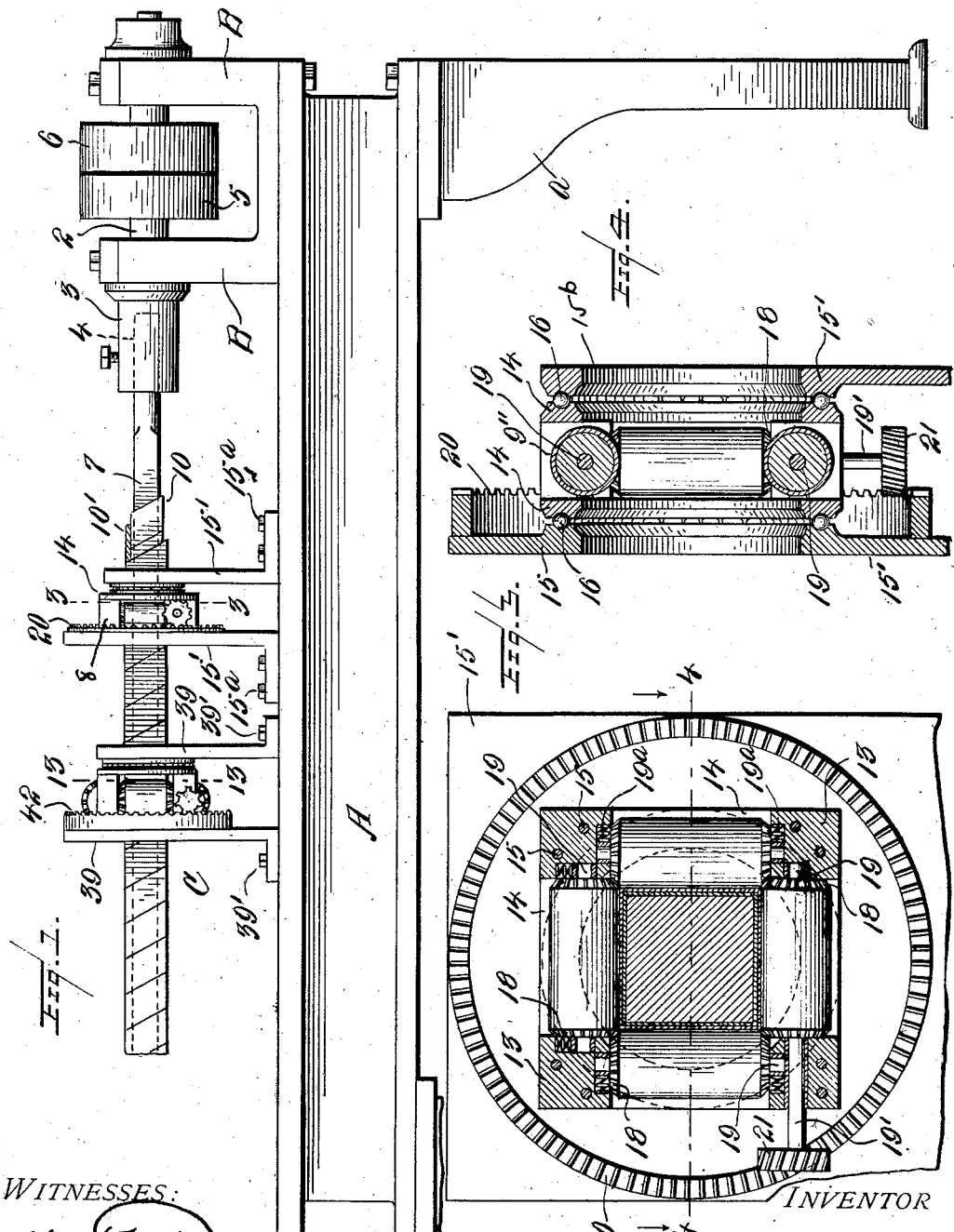

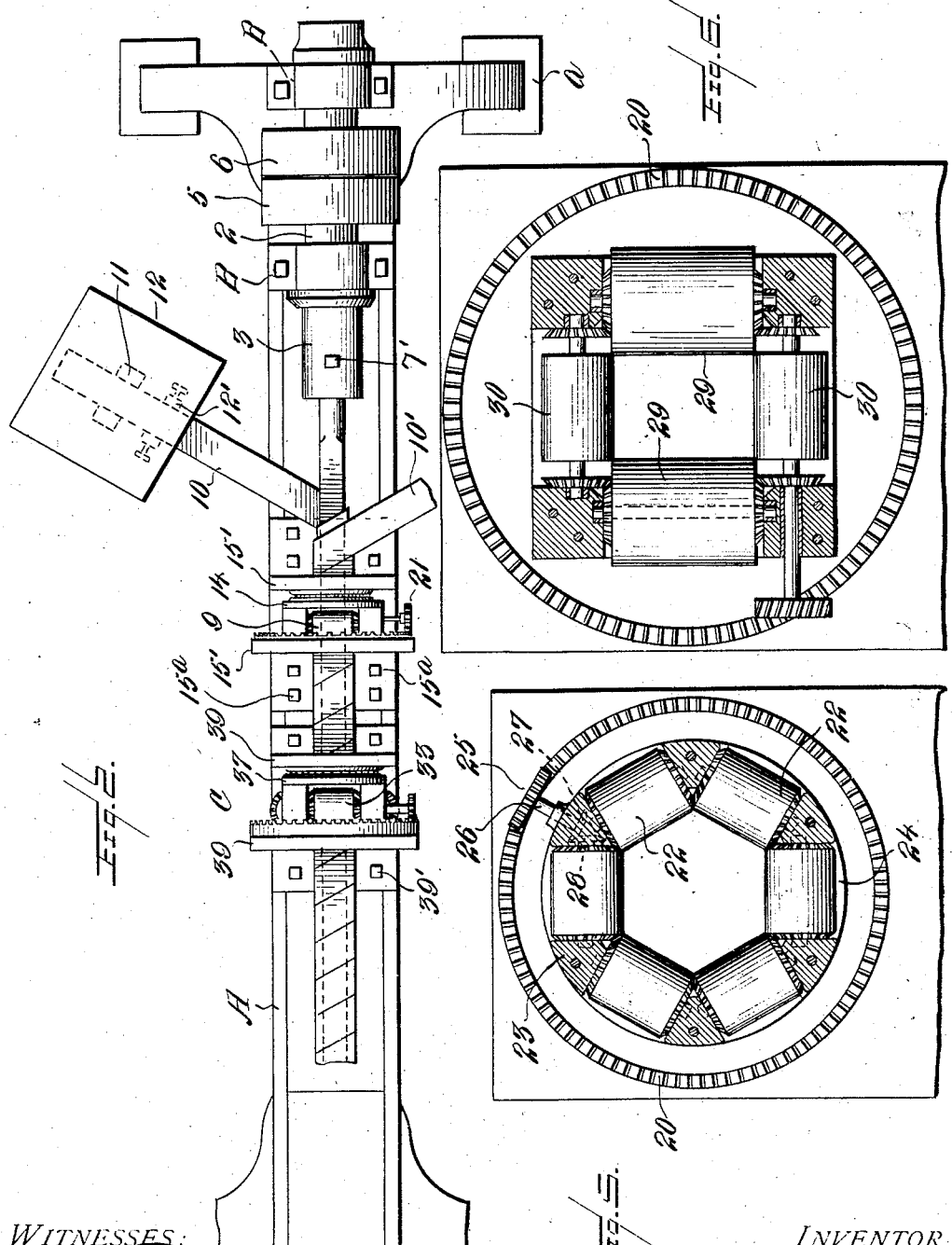

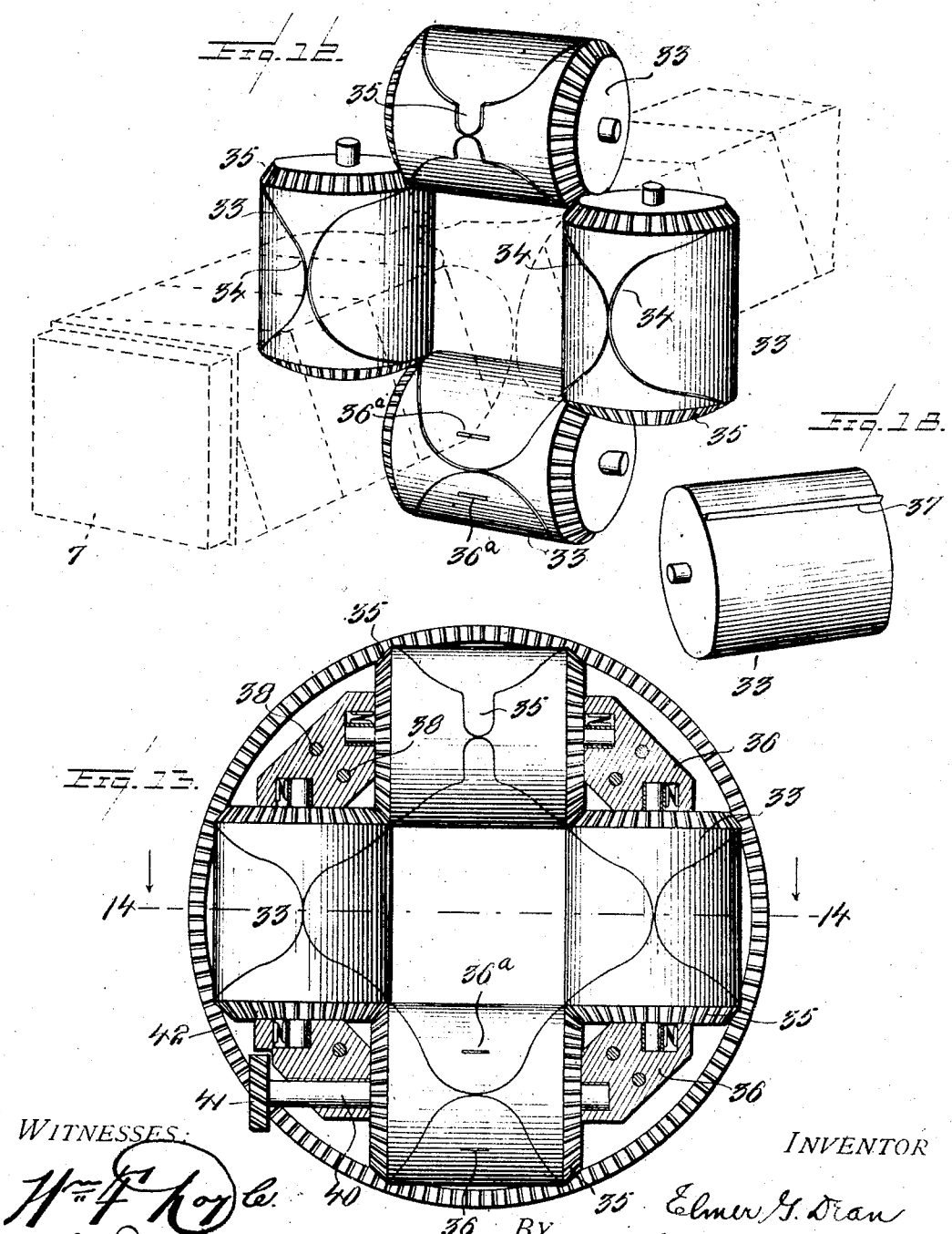

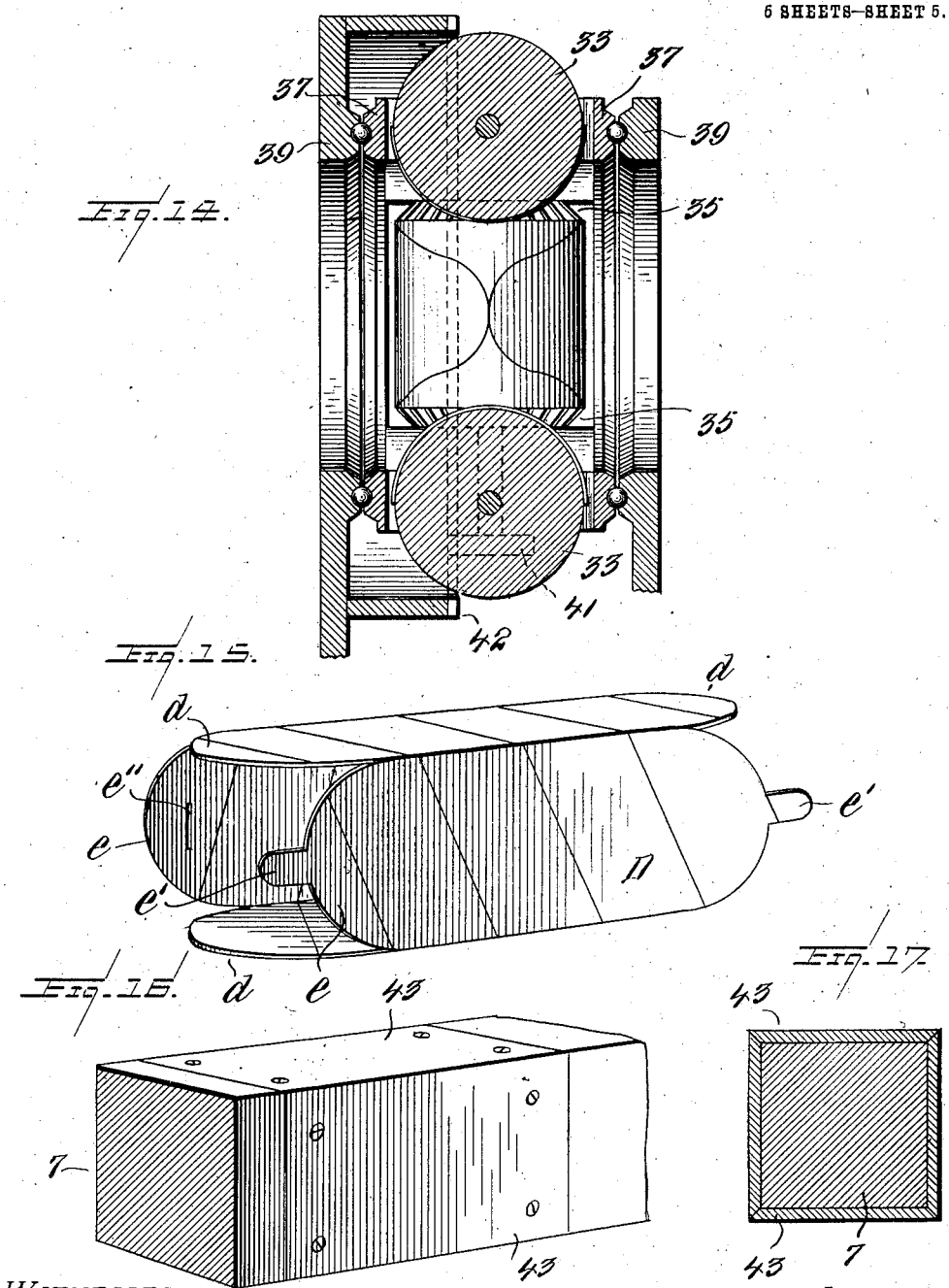

UNITED STATES PATENT OFFICE.

ELMER G. DEAN, OF NIAGARA FALLS, NEW YORK, ASSIGNOR TO AUTOMATIC LIQUID BOX COMPANY, OF NIAGARA FALLS, NEW YORK, A CORPORATION OF NEW YORK.

TUBE-MAKING MACHINE.

1,054,961.     Specification of Letters Patent.     Patented Mar. 4, 1913.

Application filed February 21, 1908. Serial No. 417,171.

*To all whom it may concern:*

Be it known that I, ELMER G. DEAN, a citizen of the United States, residing at Niagara Falls, in the county of Niagara and State of New York, have invented certain new and useful Improvements in Tube-Making Machines, of which the following is a specification.

This invention relates to mechanism for making a tube or tubes of polygonal shape in cross section, and particularly a tube or tubes of polygonal shape having continuous walls of uniform thickness.

For the purpose of illustration, I have shown in the accompanying drawings one design or form of polygonal tube forming mechanism embodying my invention.

Figure 1 is a side elevation of a machine for making or forming polygonal tubes, parts being broken away. Fig. 2 is a top plan view thereof. Fig. 3 is a transverse section on the line 3—3 of Fig. 1, on an enlarged scale. Fig. 4 is a sectional view on the line 4—4 of Fig. 3. Figs. 5, 6, 7 and 8 are sectional views illustrating modifications of the invention different from that shown in Figs. 1 to 4. Fig. 9 is a perspective view of a portion of a tube formed by the machine illustrated in Figs. 1 to 4. Fig. 10 illustrates a portion of a tube made by a machine such as shown in Fig. 5. Fig. 11 is a perspective view of portion of the rotating tube forming frame. Fig. 12 is a perspective view of the cutters showing the operation of severing the formed tube into sections. Fig. 13 is an elevation of the cutters, parts being shown in section, the view being taken on the line 13—13 of Fig. 1. Fig. 14 is a vertical section on the line 14—14 of Fig. 13, the rollers being turned to show the cutters thereon. Fig. 15 is a perspective view of a box section cut from a tube by the cutters illustrated in Figs. 12, 13 and 14. Fig. 16 is a perspective view of a portion of the former showing the surface against which the cutters operate. Fig. 17 is a transverse section through Fig. 16. Fig. 18 is a perspective view of a cutter having a straight cutting edge.

In the drawings, A indicates a suitable frame or bed preferably supported on legs or uprights *a*.

B, B, indicate a pair of standards or supports provided with bearings for a shaft 2. The standards B are secured or fixed in any suitable manner to the bed A.

5, 6, indicate fast and loose pulleys mounted on the shaft 2, whereby it may be driven from a suitable source of power.

3 indicates a coupling member fixed to and driven by the shaft 2.

7 indicates a tube former of polygonal shape in cross section. The former 7 is fixed to and supported by the coupling member 3 at one end and extends longitudinally of the bed A. The coupling member 3 is preferably formed with a socket or opening 4 to receive the inner end of the former 7.

7' indicates clamping means, such as a set screw, for detachably locking or securing the former 7 in the socket 4.

10, 10' indicate strips or tapes of suitable flexible material leading from supply webs carried by spindles 11 (only one spindle being shown) to the former 7, and comprising the material of which the tube or tubes are formed. The webs are preferably arranged on opposite sides of the former 7 and feed or deliver the strips thereto at an angle to its longitudinal axis. While I prefer to use a plurality of tapes, it may be found desirable under some conditions to form the tube from one tape or strip only.

12 indicates a receptacle for holding an adhesive material.

12' indicates devices for applying the adhesive material to one face of one of the strips.

15', 15', indicate a pair of spaced upright members each having a foot adapted for support upon the bed A.

15ª indicates bolts for securing the foot of each member to the bed A.

15ᵇ indicates an opening formed in each of the members 15', 15', through which openings the former 7 extends.

8 indicates a rotatable frame preferably comprising a pair of annular members 14, 14, surrounding the former 7 and a series of bearing blocks 13 supported by and between the annular members 14.

15 indicates bolts for securing the annular members 14 and bearing blocks 13 together and in proper position relative to each other.

16 indicates bearings, preferably of antifriction type, arranged between the opposite faces of the frame 8 and the adjacent members 15', 15', whereby the frame 8 is supported and free to rotate with the former 7.

9 indicates a series of strip-engaging devices mounted in the rotatable frame 8 and adapted to coöperate with the adjacent surfaces of the former 7 to form a tube thereon. Preferably the strip-engaging devices 9 comprise rollers, one for each surface of the former 7, rotatably supported on axles 19 arranged transversely of the former, and at angles to each other. The axles 19 project beyond the opposite ends of the rollers 9 and are mounted in suitable bearings provided therefor in the bearing blocks 13.

19$^a$ indicates tension devices, preferably coiled springs, bearing on the axle supports or bearings for the axles 19 to press the rollers 9 toward the surfaces of the former 7. These springs operate to maintain the rollers 9 in close engagement with the tape or strips fed between them and the former 7 and at the same time permit them to yield and accommodate themselves to tapes or strips of different thicknesses. It will be understood that as the former 7 is polygonally shaped in cross section and the rollers 9 press and fold the strips of material closely against the faces of the former 7, the said rollers 9 and former 7 must necessarily rotate together about the axis of the former 7. In the form of the invention illustrated in the drawings, the frame 8 is rotated in its bearings by the former 7, but it will be understood that separate means may be provided for rotating the frame 8 at the same speed as the former 7.

9'' indicates a covering of friction increasing material, such as rubber, which may be provided for each roller 9.

18 indicates gearing between the rollers 9, such gearing operating to transmit rotary motion from one roller to an adjoining one. The gearing 18 preferably comprises two bevel gears, one at each end of a roller 9, in mesh with the gears of the adjoining rollers.

20 indicates a curved or annular rack carried by one of the upright members 15'.

19' indicates a shaft preferably formed integral with the axle 19 of one of the rollers 9.

21 indicates a pinion or gear fixed to the shaft 19' at or near its free end and meshing with the rack 20.

In the operation of these parts, it will be understood that as the frame 8 rotates with the former 7, the gear 21 meshing with the rack 20, drives one of the rollers 9 and that by means of the gearing 18 the remaining rollers 9 are rotated by the driven roller. The gears 18 are preferably of the same size so that the rollers will all be rotated at the same speed.

The operation of the machine may be described as follows: The strips of material are led to the former 7, preferably at an angle of 45 degrees thereto, and folded over the longitudinal extending edges of the former 7 until engaged by the strip engaging devices 9. The former 7 and frame 8 are now connected with the source of power and driven at the desired speed. As the strip engaging devices revolve bodily with the frame 8 in unison with the adjacent faces of the former 7, they are simultaneously, by means of gearing 18, shaft 19', pinion 21 and rack 20, rotated on their own axes. By this construction and operation, the strips 10, 10', being fed continuously to the former 7 at an angle to its axis, each strip engaging device 9 presses the strips flat against the adjacent faces of the former 7 and, in coöperation with its combined revoluble movement with the former 7 about its longitudinal axis, results in folding the strips over the longitudinal edges of the former 7 on lines diagonally of the strips into close engagement with the adjoining longitudinal faces of the former 7. Since the rollers 9 are positively driven on their axes, they also operate to feed or slide the tube longitudinally of the former 7 toward its free end.

It will be understood that the operation may be continued for an indefinite time and produce a polygonal tube of any desired length having continuous walls of uniform thickness throughout. When a tube is made from two strips, they are arranged relative to each other to form broken joints.

Figs. 1, 2, 3 and 4 illustrate a polygonal tube forming machine for making square tubes such as shown at E, Fig. 9.

Fig. 5 shows one modification of the invention adapted for the making of hexagon tubes such as shown at F, Fig. 10. Referring to this latter figure, 22 indicates a series of strip engaging devices rotatably supported in bearings in blocks 23, the latter being supported by annular plates 24 which surround the former 7. 26 indicates a shaft provided with a pinion 25 at one end thereof and adapted to mesh with the curved or annular rack 20, and also provided with a gear 27 which meshes with a gear 28 fixed to the axle of the adjacent strip engaging device 22.

By the above described construction and operation, it will be understood that a polygonal tube is formed, the walls of which are composed of spirally wound material, are of uniform thickness and have a continuous portion throughout.

Fig. 6 illustrates a modified form of the invention adapted to wind a tube of rectangular shape. Referring to this figure, 29, 29 indicate two relatively long strip engaging devices and 30, 30, indicate two relatively short strip engaging devices, all of which coöperate with a rectangular shaped mandrel to form a similarly shaped tube.

Fig. 7 illustrates still another form of the invention wherein the construction is somewhat simplified. In this figure, 31 indicates a series of rollers or pressers, each provided with axles 19 which are rotatably mounted in bearing blocks 13. Each roller 31 comprises a main portion 32 which presses the tubes or strips against the adjacent side of the mandrel, and auxiliary or conically shaped portions 32' at the opposite ends of the main portion and adapted to press the tapes or strips against parts of the adjoining sides of the mandrel. As will be clearly understood from Fig. 7, the conical portions 32' of two adjoining rollers 31 coöperate with each other to press the tapes against that face of the mandrel between the faces against which the main portions 32 of said rollers operate. By this construction, the tapes or strips are pressed against every face of the mandrel and spirally wound around it, although the number of rollers is less than the number of faces on the mandrel. This form of construction is particularly adapted in making a tube which has a large number of sides.

In Fig. 8 I have shown a forming mechanism having strip engaging devices 31' mounted therein, such devices being similar to the devices 31, shown in Fig. 7, except that their adjacent side engaging members 31ª extend at right angles to the surface of the strip engaging devices 31'.

It will be understood that the strip engaging devices being removable, they may be changed and devices of a different size in diameter, or of a different shape, substituted, according to the shape and size of the former it is desired to use, and also, by removing one of the plates 15' the frame 8 and devices mounted therein may be removed and a new or different frame with the desired shape and size of strip engaging devices substituted when the tube it is desired to make, by reason of its shape or size, cannot be made by the devices and former already mounted in the machine.

If desired, the sides of the tube may be slightly convexed or concaved by convexing or concaving the sides of the former and shaping the peripheries of the devices to coöperate therewith.

I combine with the tube winding mechanism means, indicated as a whole at C, for severing the tube into lengths or sections adapted for various purposes.

The cutting mechanism comprises a series of cutters preferably arranged at right angles to the axis of the mandrel or direction of movement thereon of the formed tube and adapted to revolve in unison with the former and the tube formed thereon. Each cutter preferably comprises a roller 33 carrying a knife or knives. In the form of the invention illustrated, the cutters are mounted in suitable yielding bearings in blocks 36, held in proper position relative to each other by plates 37, 37, and bolts 38. The plates and bearing blocks for the cutters are rotatably supported in uprights 39, 39, the latter being removably fixed by bolts 39' to the bed A of the machine.

The cutters are caused to rotate positively on their own axes in unison and preferably all operate to sever the sides of the tube simultaneously. In the present embodiment of the invention each of the cutters is illustrated as being provided with gears 35, 35, meshing with similar gears on adjoining cutters. Preferably secured to the axle of one of the cutters is a shaft 40, carrying a pinion 41 at its outer end in position to mesh with a stationary curved rack 42 carried by one of the uprights 39.

It will be seen from the foregoing description that the construction of the cutter-carrying frame and the mechanism for causing the cutters to rotate is similar in many respects to those parts that support and operate the tube forming mechanism. It will also be seen that I have described and illustrated only one set of cutters, such set being adapted to coöperate with a polygonal former of square shape to sever into lengths a tube that has been formed thereon; but it will be understood that the cutters are adapted to be arranged and constructed so as to coöperate with formers of different shapes without departing from the spirit of my invention. Thus when a former having six sides is used and a tube of similar shape is formed thereon, I provide cutters adapted to operate upon all six sides of the tube.

The knives carried by the rollers 33 may be shaped to sever the tube into sections with flaps or tongues or tabs attached at one or both ends thereof of any desired outline.

In Figs. 12 and 13 I have represented knives of suitable form for this purpose. Referring to such figures, 34 indicate the knives shaped to cut out folding-over flaps. In order that the flaps may be provided with interlocking means, I adapt the knife on one of the rollers to cut out a tongue portion, as indicated at 35, and provide the roller opposite thereto with a slitting knife 36.

D, Fig. 15, represents a section of tubing severed by the knives shown in Figs. 12 and 13. By first folding down the flaps $d$, $d$, and then the flaps $e$, $e$, and inserting the tongue $e'$ in the slit $e''$, it will be seen that the section is tightly closed at one end.

When it is desired to cut the tube into lengths without the folding-over flaps, I provide rollers with straight edged knives, such as shown at 37, Fig. 18. The rollers being removable, rollers carrying knives of any other shape may be substituted when desired.

In the form of the invention illustrated in Figs. 12 and 13, each roller preferably carries two knives set in opposite directions, whereby they cut out the flaps at both ends of the severed sections. In the form of the invention herein shown, the rollers are made of such size that the length of the section to be cut is equal to the distance from the tip of one flap-cutting knife around the roller to the tip of the other flap-cutting knife. I prefer to mount the knives so that their tips come as close together as possible. In such a construction the length of the section will be approximately equal to the circumference of the roller. By substituting rollers of greater or less circumference, a longer or shorter section may be cut.

At 43, Figs. 16 and 17, I have illustrated coöperating means preferably comprising a series of wooden blocks inlaid in each surface of the former and extending for a short distance in front and back of the cutters. This wooden surface permits the knives to sever the tube with a clean cut without being injured.

The machine herein shown is capable of use with or without the cutting mechanism. When desired, the cutting mechanism may be detached entirely by removing one of the plates 39.

Beyond the tube forming mechanism, the tube is delivered between the cutting rollers, which latter also revolve with the former around its longitudinal axis. Through the revolution of the cutters, they are rotated on their own axes, in a manner similar to the strip engaging devices, causing the knives to come into operative position at each revolution of the rollers to sever the tube into sections.

From the foregoing description it will be seen that I provide cutting mechanism which moves in unison with the formed tube and the knives of which operate on the tube at predetermined intervals. Furthermore, in the particular form of the invention illustrated, since the knife supports are revolved by the former around its axis the speed of revolution of said supports about their own axes will increase or decrease automatically in proportion to the increase or decrease in speed of the former. As a result of this construction it will be seen that the knives will always cut the tube into sections of uniform length, although the mandrel may be driven at varying speeds.

What I claim is:

1. In a polygonal tube making machine, the combination of a polygonal former rotatably mounted at one end, means for rotating said former, means for supplying a strip of material thereto at an angle to its axis, and a strip engaging device arranged adjacent to each face or side of the former and operating in coöperation with an adjoining device to fold the strip on diagonal lines over a longitudinal edge of the former into engagement with and parallel to the said adjacent face thereof, the said strip engaging devices and said former being movable together at the same speed about the axis of said former.

2. In a polygonal tube forming machine, the combination of a rotatable former bounded by a series of substantially flat surfaces extending longitudinally thereof, means for continuously rotating the said former, means for feeding a strip to the former at an angle to its longitudinal axis, a series of revolubly mounted devices, one for each face of the former and arranged transversely thereof, for engaging with the said strip and coöperating one with another and with the flat surfaces of the former to form a polygonal tube thereon, the said strip engaging and folding devices and the former being movable together about the axis of said former.

3. In a polygonal tube making machine, the combination of a rotatable former bounded by a series of substantially flat faces extending longitudinally thereof, means for rotating the said former, means for feeding a strip of material thereto at an angle to its longitudinal axis, a series of revolubly mounted devices, each rotatably mounted on an axis transversely of the former, coöperating one with another and with the faces thereof to fold the strip into engagement with the said faces, the said strip engaging devices and said former being movable together about the axis of the latter, and means for simultaneously rotating the said devices on their axes for feeding or sliding the tube longitudinally of the former.

4. In a polygonal tube making machine, the combination of a rotatable polygonal former, means for rotating the said former, means for feeding a strip of material to the former at an angle to its longitudinal axis, a series of revolubly mounted devices arranged transversely of and parallel to the faces or sides of the former, and operating to fold the strip of material on lines diagonal to its length into engagement with the faces or sides of the former to form a polygonal tube, the said former operating to revolve the strip folding devices in unison therewith.

5. In a plygonal tube making machine, the combination of a rotatable polygonal former, means for rotating the said former, means for delivering a strip of material thereto at an angle to its longitudinal axis, a series of devices arranged transversely of and parallel to the faces or sides of the former and coöperating therewith to fold the strip of material on lines diagonal to its length into engagement with the faces or sides of the former, means for revolubly and rotatably supporting the said devices, the said former operating to revolve the strip folding devices in unison with the faces or sides thereof, and means operated by the revolution of the said strip folding devices for rotating them on their own axes for feeding or sliding the formed tube longitudinally of the former.

6. In a polygonal tube making machine, the combination of a rotatable polygonal former, means for rotating the said former, means for supplying strips of material thereto from opposite sides and at an angle to its longitudinal axis, and devices coöperating with the faces or sides of the former to fold the said strips over the longitudinal edges of the former into engagement with the faces or sides thereof on lines diagonal to the said strips, the said strip engaging devices and said former being movable together about the axis of the latter.

7. In a polygonal tube making machine, the combination of a rotatable polygonal former, means for rotating the said former, means for delivering strips of material thereto from its opposite sides and at angles to its longitudinal axis, rotatable devices movable in unison and coöperating with the faces or sides of the former to fold the said strips over the longitudinally extending edges thereof into engagement with its faces or sides on lines diagonal to the said strips, and means for simultaneously rotating the said strip folding devices to feed the formed tube longtudinally of the former.

8. In a polygonal tube making machine, the combination of a rotatable polygonal former, means for rotating said former, means for delivering a strip of material to said former at an angle to its longitudinal axis, and a device arranged transversely of and parallel to each face or side of the former for engaging with the said strip of material and operating in coöperation with an adjoining device to fold the strip of material on a diagonal line into engagement with adjoining faces or sides of the former, the said strip engaging devices being movable in unison with the former about its longitudnal axis.

9. In a polygonal tube making machine, the combination of a rotatable polygonal former, means for rotating said former, means for delivering a strip of material to said former at an angle to its longitudinal axis, and a rotatable device arranged transversely of and parallel to each face or side of the former for engaging with the said strip of material and operating in coöperation with an adjoining device to fold the strip of material on a line diagonal to its length into engagement with adjoining faces of the former, the said strip folding devices and said former being movable in unison together about the axis of the latter, and means for positively rotating the said strip engaging devices to feed or slide the formed tube longitudinally of the former.

10. In a polygonal tube making machine, the combination of a rotatable polygonal former, means for rotating the said former, means for delivering a strip of material to said former at an angle to its longitudinal axis, a series of rotatable devices having faces arranged at angles to each other and adapted to engage with the said strip to form a polygonal tube, each of said devices being movable in unison with the adjacent face or side of the former and operating in coöperation with an adjoining device to fold the strip on a line diagonal to its length over a longitudinally extending edge of the former into engagement with the adjacent face thereof, means for positively rotating one of said devices, and gearing for transmitting the rotary motion of the driven device to the other devices of the series.

11. In a polygonal tube making machine, the combination of a rotatable former, means for rotating the said former, means for delivering a strip of material thereto at an angle to its longitudinal axis, a series of rotatable devices having faces arranged at angles to each other and adapted to engage with the said strip of material to form a polygonal tube, each of said devices being movable bodily in unison with the adjacent face or side of the former and adjoining devices about the axis of said former and coöperating with each other to fold the strip of material on a line diagonal to its length over a longitudinally extending edge of the former into engagement with the adjoining faces thereof, means for positively rotating one of said devices, and gears carried by the opposite ends of each of said devices and meshing with the gears of adjoining devices for transmitting the motion of the driven device thereto.

12. In a machine for making polygonal tubes, the combination of a rotatable polygonal former, means for rotating the said former, means for delivering a strip of material thereto at an angle to its longitudinal axis, a series of devices arranged to engage with the said strip and fold it on lines diagonal to its length into engagement with the faces or sides of the former, and means for supporting the said devices relative to the faces or sides of the former whereby the said former operates to revolve the said devices in unison therewith.

13. In a machine for making polygonal tubes, the combination of a rotatable polygonal former, means for rotating the said former, means for delivering a strip of material thereto at an angle to its longitudinal axis, a series of rotatable devices arranged to engage with the said strip and fold it on lines diagonal to its length into engagement with the faces or sides of the former, means for supporting the said strip engaging devices relatively to the faces or sides of the former whereby the said former operates to revolve the said devices in unison therewith, and means operated by the revolution of the said devices for rotating them on their own axes.

14. Means for making a polygonal tube having continuous walls of uniform thickness, comprising a rotatable member bounded by a series of longitudinally extending flat surfaces, means for rotating said member, means for delivering strips of material to said member at angles to its longitudinal axis, and a series of devices engaging with said strips and operating to fold them on lines diagonal to their length into engagement with the faces of said member to form a polygonal tube and simultaneously feed or slide the formed tube longitudinally of said member, the said strip folding devices and said member being movable together about the longitudinal axis of the latter.

15. Means for making a polygonal tube having continuous walls of uniform thickness, comprising a rotatable member bounded by a series of longitudinally extending flat surfaces, means for rotating said member, means for delivering strips of material to said member at angles to its longitudinal axis, a series of devices engaging with said strips and operating to fold them on lines diagonal to their length into engagement with the faces of the former to form a polygonal tube and simultaneously feed or slide the formed tube longitudinally of the former, and tension devices for yieldingly supporting the said strip engaging and folding devices relative to the faces for the former.

16. Means for making a polygonal tube having continuous walls of uniform thickness, comprising a rotatable member bounded by a series of flat, longitudinally extending faces, means for rotating said member, means for delivering strips of material thereto at angles to its longitudinal axis, a rotatable roller having a surface arranged parallel to and bodily movable in unison with each face of the member about the longitudinal axis of the latter for engaging with the said strips, each of said rollers and the adjacent face of the member coöperating with an adjoining roller and the face of the member adjacent thereto to fold the said strips on lines diagonal to their length into engagement with the adjacent faces of the member, and means for rotating said rollers to feed the tube formed thereby longitudinally of the member.

17. The combination of a rotatable former, means for delivering a tape thereto, means for spirally winding the said tape on the former to form a tube, and means for severing the tube into lengths or sections with folding-over flaps attached thereto at one end.

18. The combination of a former, means for delivering a tape thereto, means for spirally winding the tape around the former to form a tube thereon, and means for severing the tube into lengths with folding-over and interlocking flaps attached thereto at one end.

19. The combination of a former, means coöperating with said former for spirally winding a tube thereon and operating to move the said tube around the axis of said former, and cutters movable with the formed tube around the axis of the former for cutting the tube into lengths.

20. The combination of a rotatable former, means for rotating the said former, means for delivering a tape thereto, devices coöperating with the former for spirally winding the tape thereon to form a tube, rotatable cutters revoluble with the former, and means for positively rotating the cutters on their own axes.

21. The combination of a polygonal former, means for delivering a tape thereto, means for winding a tube on said former, and cutters revoluble around the longitudinal axis of the former arranged to engage with and cut each side or surface of the tube simultaneously and sever it into lengths.

22. In a box making machine, the combination of a rotatable, polygonally shaped mandrel, means for rotating the mandrel, means for feeding a tape thereto, means coöperating with the mandrel for spirally winding the tape thereon in the form of a tube, a cutter for each side of the tube and revoluble with the mandrel around its longitudinal axis, and means for operating the cutters.

23. The combination of a rotatable polygonal former, means for rotating the former, means for spirally winding and feeding a formed tube along the former, and cutters coöperating with the sides of the former and revoluble about its longitudinal axis for severing the tube into lengths.

24. The combination of a rotatable, polygonal former, means for rotating the former, means for winding and delivering a tube along the former, a cutter for each side of the former, means for operating the cutters, and means carried by each side of the former and coöperating with each adjacent cutter for severing the tube into lengths.

25. The combination of a rotatable, polygonal mandrel, means for rotating the mandrel, means for feeding a tube along the mandrel, and cutters revoluble in unison with the mandrel for severing the tube into lengths, the axes of the cutters being arranged at right angles to the axis of the mandrel.

26. The combination of a former, means for delivering a formed tube along the former, and cutters revoluble about its longitudinal axis for severing the tube into lengths or sections with folding-over flaps attached at one end.

27. The combination of a rotatable, polygonal mandrel, means for rotating the mandrel, means for moving a formed tube longitudinally of the mandrel, cutters, one for each side or surface of the tube, revoluble in unison with the mandrel, and means for automatically operating the cutters to sever the tube into lengths.

28. In a tube making machine, the combination of tube forming mechanism comprising a rotating former, strip delivering means, and means coöperating with the former to form a tube and feed it to a cutter mechanism, a revolubly mounted cutter supporting mechanism driven bodily by the former in unison therewith, and cutters automatically operated by the revolution of the cutter supporting mechanism for severing the formed tube into sections.

29. In a polygonal tube making machine, the combination of polygonal tube forming mechanism, including a rotating polygonal former, a series of rotatably mounted cutters having knives arranged parallel to the faces of the former for severing the formed tube into sections, means for revolubly supporting the cutters and permitting them to be bodily revolved by and in unison with the said former, and means for rotating the cutters for operating the said knives.

30. The combination of tape feeding means, means for spirally winding the tape delivered by the said tape feeding means into a polygonally-shaped tube, and a cutter for each side of the tube for severing the formed tube into lengths.

31. The combination of tape feeding means, a rotatable, polygonal former, means for rotating the former, means for spirally winding a polygonal tube on the former, and means revoluble with the former for severing the formed tube into lengths or sections with flaps or tabs at one end.

32. The combination of tape feeding means, a rotatable, polygonal mandrel, means for rotating the mandrel, means for spirally winding a polygonal tube on the mandrel and feeding it longitudinally thereon, and means revoluble with the mandrel for severing the formed tube into lengths or sections with flaps or tabs at one end.

33. In a machine of the character described, the combination of a rotatable, polygonal former, means for rotating the former, means for feeding a tape to the former, devices revoluble with the former for spirally winding the tape into a polygonal tube around the former, and cutters revolving with the former for severing the formed tube into lengths.

34. In a machine of the character described, the combination of a rotatable, polygonal former, means for rotating the former, means for feeding a tape thereto, devices revoluble with the former for spirally winding the tape into a polygonal tube around the former, and cutters revolving with the former and operating at predetermined intervals for severing the tube into lengths.

35. The combination of tape or strip feeding means, means for spirally winding the tape or strip into a polygonal tube including a rotating member, and cutters, controlled by said rotating member, for severing the formed tube into sections.

36. The combination of tape feeding means, means for spirally winding the tape into a tube, the said winding means including a rotatable member on which the tube is formed, cutters revoluble with said rotating member for severing the tube into sections, and means controlled by said rotating member for operating said cutters.

37. The combination of tape feeding means, means for spirally winding the tape into a polygonal tube, the said winding means including a rotating member on which the tube is formed, knives for severing the tube into sections, means for supporting said knives and permitting them to be revolved by said rotating member in unison with it, and means for operating said knives.

38. In a machine for making polygonal tubes, the combination of a mandrel of polygonal shape in cross section and rotatably supported at one end, means for rotating said mandrel, a roller extending transversely across each side of said mandrel and arranged parallel and adjacent thereto, each roller being of a length equal to the width of the adjacent mandrel side and bodily movable in unison with the mandrel around its longitudinal axis, means for rotating the rollers on their own axes during their bodily movement with the mandrel, and means for delivering a strip of material between the rollers and sides of the mandrel at an angle to its axis, each roller operating to press the strip against the adjacent mandrel side to prevent circumferential movement of the strip relative to the side or sides of the mandrel, and each roller and the adjacent side of the mandrel coöperating with an adjoining roller and mandrel side adjacent to said roller to fold and score the strip on diagonal lines over the longitudinal corner or edge of the mandrel between said two adjoining sides and into engagement therewith to shape the tube, and said rollers also operating to feed the tube longitudinally along the mandrel.

39. The combination of tape feeding means, means for spirally winding the tape into a tube, the said winding means including a rotatable member on which the tube is formed, cutters revoluble with said rotating member for severing the tube into sections, each cutter operating to cut a portion of the tube circumferentially, and connections between the cutters whereby they coöperate to cut each portion at the proper place relative to cuts of the adjoining portions around the said tube.

40. The combination of a rotatable mandrel, the adjoining sides of which are at right angles to each other, means for rotating the mandrel, a series of devices, one for each side of the mandrel, arranged adjacent and parallel to the mandrel sides, means for supporting the said devices to move in unison with said mandrel around its longitudinal axis, and means for continuously feeding or delivering strips of material between the mandrel and said devices at an angle, said devices operating to prevent circumferential movement of the strips on the mandrel and to fold said strips on diagonal lines over the edges of the mandrel to form a tube having its adjoining sides at right angles to each other.

41. In a tube forming machine, the combination of a two-part mechanism arranged to engage with a strip of material, the said mechanism comprising a rotatable polygonal mandrel and a series of revolubly mounted strip folding devices arranged at angles to each other and adjacent and parallel to the sides of said mandrel, whereby said two parts move together in unison, means for delivering a strip of material between the mandrel and said devices at an angle, the mandrel and devices coöperating to prevent circumferential movement of the strip on the mandrel and to fold the strip on diagonal lines over the edges of the mandrel to form a polygonal tube, and means for driving one part of said strip engaging mechanism.

In testimony whereof I affix my signature in the presence of two witnesses.

ELMER G. DEAN

Witnesses:
  GEO. B. PITTS,
  C. W. FOWLER.